United States Patent [19]

Sanford

[11] 4,443,694

[45] Apr. 17, 1984

[54] MULTILEVEL BAR CODE READER

[75] Inventor: Robert F. Sanford, Lubbock, Tex.

[73] Assignee: Texas Instruments Incorporated, Dallas, Tex.

[21] Appl. No.: 318,667

[22] Filed: Nov. 5, 1981

[51] Int. Cl.³ .............................................. G06K 7/12
[52] U.S. Cl. ................................. 235/465; 235/462; 235/466; 235/472
[58] Field of Search ................ 235/465, 472, 466, 462

[56] References Cited

U.S. PATENT DOCUMENTS 3,798,421 3/1974 Gilberg ................................ 235/465
4,172,554 10/1979 Clarinval ............................. 235/465
4,337,375 6/1982 Freeman .............................. 235/472

Primary Examiner—Harold I. Pitts
Attorney, Agent, or Firm—Robert D. Marshall, Jr.; Leo N. Heiting; Melvin Sharp

[57] ABSTRACT

A bar code reader is sensitive to at least three levels of darkness. At least three levels of darkness are utilized in the bar code so that, a higher density of data is thereby achieved. In the preferred embodiment, the bar code is encoded so that a transitional change from one level of darkness to another level of darkness is indicative of the data bits encoded. The bar code reader is passed over the multilevel bar code and through the use of a linear conversion such as by an analog to digital converter, the level of darkness of the bar is communicated to a decipher so as to be translated into a binary sequence.

19 Claims, 9 Drawing Figures

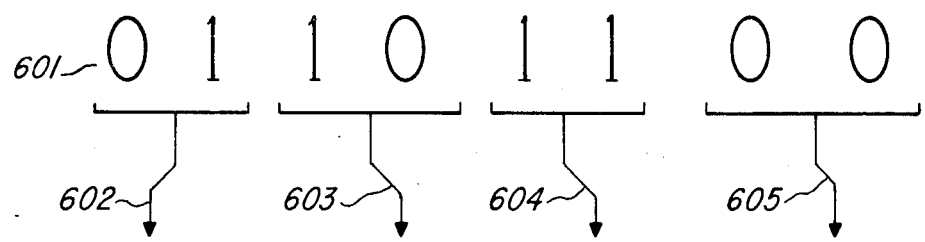
Fig.6a
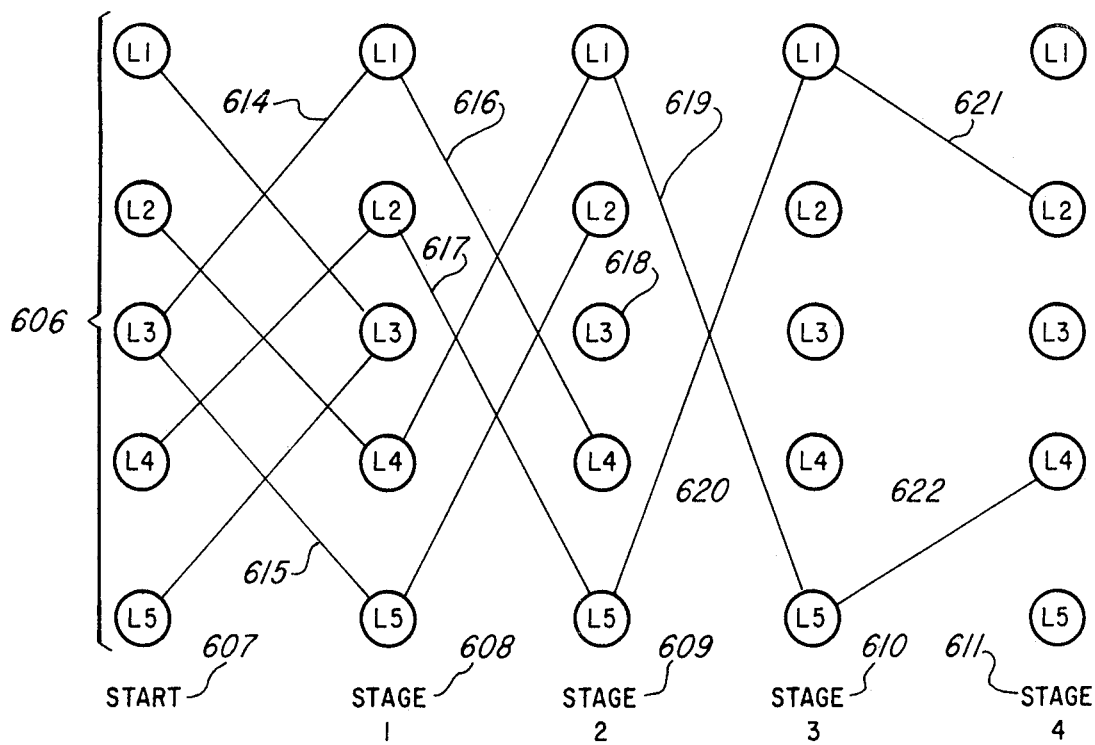
Fig.6b
L4 L2 L5 L1 L2 : SEQUENCE 1
L2 L4 L1 L5 L4 : SEQUENCE 2
Fig.6c

MULTILEVEL BAR CODE READER

BACKGROUND OF THE INVENTION

The present invention relates to a bar code reader and more particularly to a high density bar code reader.

Bar code scanners and readers are intrinsically tied to the bar code being read. A bar code is typically a printed series of bars having either uniform or varying widths interposed upon a white or contrasting background. At the present, approximately 50 commercial bar code systems are being used; of these, only four bar code systems are principally used.

The bar code target, the series of bars, is formulated so as to communicate a series of binary data which is indicative of some information for use by a computer, calculator, or the like. The Universal Product Code (UPC) has been widely accepted and utilized by the food industry to mark products. At the point of sale, the bar code target is moved relative to a scanner which reads the bar code and is thereby informed of the product identification. The product identification is used to formulate or compute the price of the product.

One method to increase the data density of bar code, is to have the bar size decreased from 20 thousandths of an inch standard to 5 thousandths of an inch (mil) widths so as to allow more compaction of the data string. This width though is extremely difficult to print and additionally requires a more complex optical system for reading. The costs of printing and optical requirements have made this solution unreasonable.

For a good review of the bar code use and applications, refer to "Reference Guide" for "Bar Code Scanning" by MSI Data Corporation, copyright 1980, incorporated hereinto by reference. This manual focuses on seven bar codes and explains the basics of bar code structures and optical wand scanners and their functions.

None of the current bar codes are capable of obtaining a data density sufficient for many uses. Their restraint lies in the fact that although reducing the width of the bar size itself does increase the density, the associated problems with the optical reader make it economically infeasible to utilize a 5 mil or smaller bar size.

SUMMARY OF THE INVENTION

The present invention generates electronic signals in response to a selected portion of the bar code target. In response to the signals, the darkness level, one of at least three darkness levels, associated with that portion of the bar code is generated. In response to the levels so generated, a set of data is generated in response to the darkness levels so generated.

It is important to note at the outset that the bar code system which the present invention utilizes has at least three levels of darkness. As example, in a three level situation, the darkness levels are white, black, and grey. This multilevel use of bar darkness allows the use of a much wider than 5 mil bar, yet maintains a high data density.

In the preferred embodiment, the bar code reader is handheld so that it is easily moved relative to the printed bar code. As the bar code reader is passed over the bar code, through the use of optics and an electro-optical transducer, the darkness level of the focused bar within the bar code is preceived. This darkness level is stored or sent directly to a decipher means to generate a data string indicative of the encoded data on the bar code target.

One such handheld bar code reader suitable for this task is described in U.S. Pat. No. 3,892,974 to Ellefson et al, entitled "UNITARY FLEXIBLE CIRCUIT FOR PEN READER", incorporated hereinto by reference. The Ellefson et al patent describes a bar code reader in which the reader components are arranged in a flexible unitary structure so that they are contained totally within the reader housing.

The optics used by the bar code reader are such that an image of a particular bar within the bar code target is focused onto the electro-optical transducer. Numerous optical relationships and electro-optical apparatus exists which are suitable in this application. One such arrangement described in U.S. Pat. No. 3,784,794 issued to Allais entitled "ELECTRO-OPTICAL READER FOR BAR CODES OR THE LIKE", issued Jan. 8, 1974, incorporated hereinto by reference. The electro-optical reader of Allais has a transparent and substantially spherical member which conducts the light from the surface of the bar code target to the electro-optical element.

In the preferred embodiment the electro-optical element has a light emitting diode (LED) for a light source and a photo-transitor as a sensor. Other devices such as a charge coupled device (CCD) and photo diodes are optionally usable as sensors.

The electrical signals from the sensor are analyzed so as to match their strength and density to the appropriate level of darkness associated with the bar. As indicated before, the bar within the bar code is chosen from a set having at least three elements. Use of more than three elements allows for an even higher density of data to be stored within the bar code target and to be retrievable by the bar code reader of this invention. In the preferred embodiment, five levels of darkness are used.

Once the appropriate level of darkness has been determined, it is optionally stored for a later analysis or is communicated directly to a decipher means which utilizes the level of darkness in generating a set of data representative thereof. This data is preferably in a bit or binary string form so as to describe the entire bar code target as the bar code reader is passed thereover.

This data is communicatable to such apparatus as a central processing unit, a storage means, or the like. Since the bar code target has been encoded to describe particular data, command, or instruction, the data is representative thereof and describes the same situation. The data is more susceptible to use in a digital computer or for digital storage.

One preferred application for the binary data is use in control of a speech synthesizer for the generation of human speech. As example, the binary data string is descriptive of printed textural material and therefor describes the words to be generated by the speech synthesis means. The conversion to speech of printed text is well known in the art and is described by U.S. Pat. No. 3,704,345 issued Nov. 28, 1972, to Coker et al and is entitled "CONVERSION OF PRINTED TEXT INTO SYNTHETIC SPEECH" incorporated hereinto by reference. The Coker et al patent discloses a system where the test is converted into an alphanumeric data signal that is subjected to various rules as to syntax and phase category prior to its phonetic synthesis of the word.

One such synthesis device is described by U.S. Pat. No. 4,209,844 issued to Brantingham et al on June 24, 1980, entitled "LATTICE FILTER FOR WAVEFORM OR SPEECH SYNTHESIS CIRCUITS USING DIGITAL LOGIC", incorporated hereinto by reference. The lattice filter disclosed by the Brantingham et al patent is in the form of a linear predicitve filter in which a multiplier and an adder are coupled in a feedback relationship for generation of the lattice filter.

Utilization of the speech synthesis means allows the bar code, due to its high density level, to be imprinted directly beneath the printed words so as to allow the user to pass the wand in direct reiationship to the words he desires to be spoken. It should be noted that the user need not be able to recognize the word since the bar code reader determines the word through the encoded multilevel bar code and commuicates this to some synthesizer or processor. Hence, even though the user is uneducated, young, or of a foreign nationality so as not to recognize the content of the printed word, through the use of the present invention and the multilevel bar code target, it is readily translated into an auditory language understandable by the user.

The invention and a particular embodiment thereof is more fully explained by the following drawings and their accompanying descriptions.

BRIEF DESCRIPTION OF THE DRAWINGS

FIGS. 6a, 6b and 6c illustrate an encoding scheme for the determination of applicable bar codes from a binary data string.

DESCRIPTION OF THE PREFERRED EMBODIMENT

Figure 1:
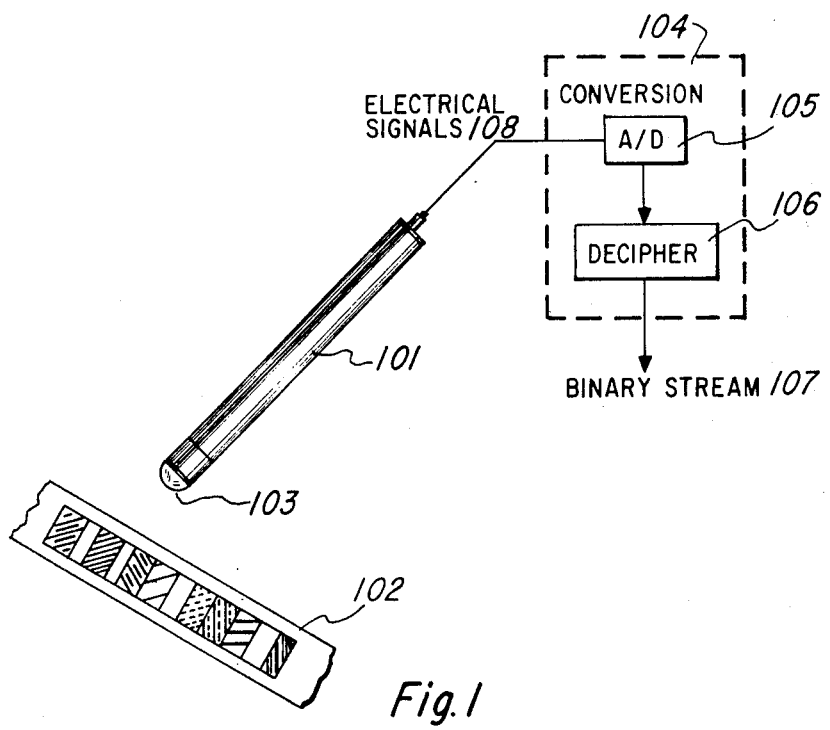
FIG. 1 is a block diagram of of an embodiment of the invention.

FIG. 1 is a block diagram of an embodiment of the invention.

As the optical system 103 of wand 101 is passed over the bar code target 102, electrical signals 108 are generated representative of the bars within the bar code target 102. These electrical signals 108 are communicated to the conversion means 104. The conversion means 104 contains an Analog-to-Digital converter (A/D) 105 which communicates the analog signals from the wand 101 to digital form for use by the decipher means 106.

The decipher means translates the digital signals received into a binary stream 107 which is communicated to the appropriate apparatus (not shown). The decipher means 106 determines the darkness level of the particular bar within the bar code target 102 which the wand 101 is currently focused upon. This darkness level, either by itself, or when taken in context with the previous bar code darkness level is indicative of a particular data sequence. This sequence is then communicated typically in a binary stream 107.

Figure 2:
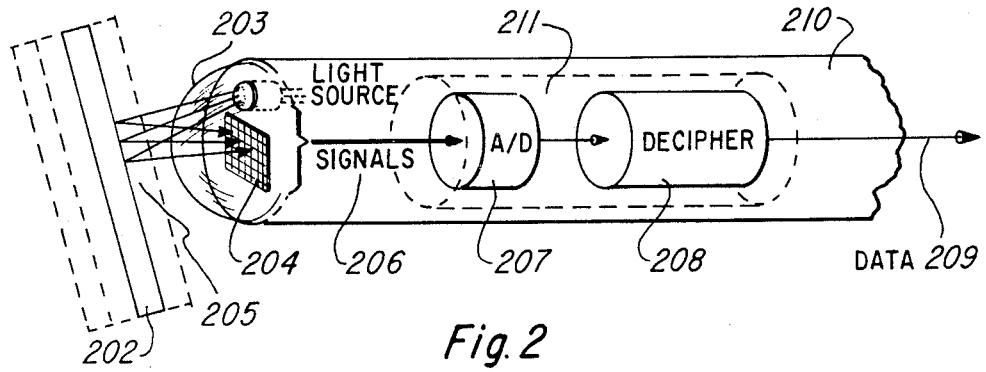
FIG. 2 illustrates an embodiment of the invention in the electro-optical operation of an embodiment of the invention.

FIG. 2 is cutaway view of an embodiment of the invention illustrating the optical characteristics of an embodiment of the bar code reader.

The bar code target 201 contains a sequence of bars, such as 202, chosen from a set having at least three levels of darkness. The bar code reader 210 is focused upon a particular bar 202. Light rays from the light source 203 impinge upon the bar 202 and are reflected back, 205, to a photo transistor 204. In this context the photo transistor 204 and light source 204 are acting as an electro-optical device. The photo transistor 204 generates an electronic signal 206 which is communicated to a storage means 207, indicated here as an Analog to Digital (A/D) convertor. The parallel data from the A/D convertor 207, is communicated to the Decipher 208 which interprets the bar code information and transmits the data therefrom to a lost system.

In this embodiment of the invention, the translation means 211 is contained within the handheld wand 210. This allows the wand to thereby be "intelligent" in that it directly translates, as a unitary body, the bar code target and the output therefrom is directaly usable.

Figure 3A:
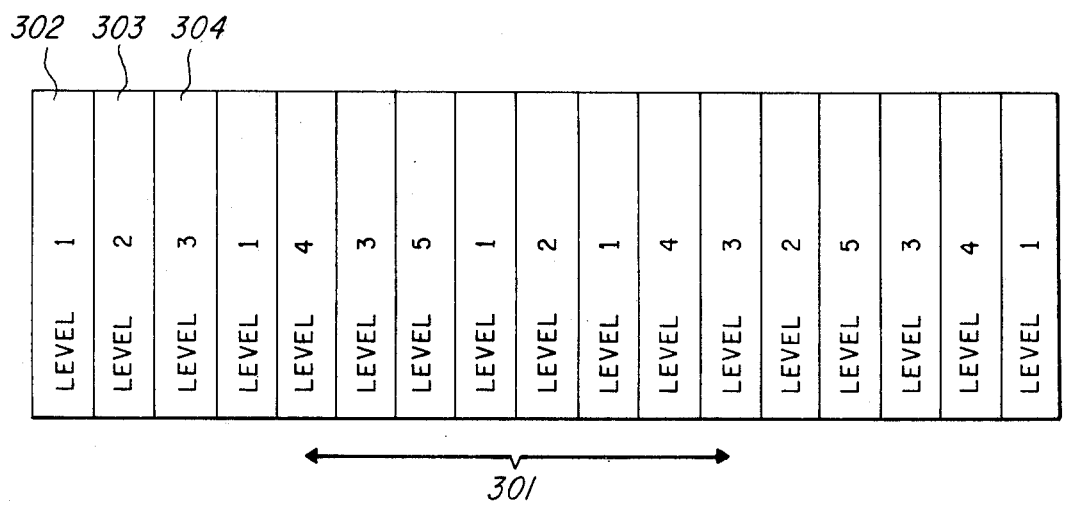
FIGS. 3a and 3b illustrate the encoding scheme in a five level bar code embodiment.
Figure 3B:
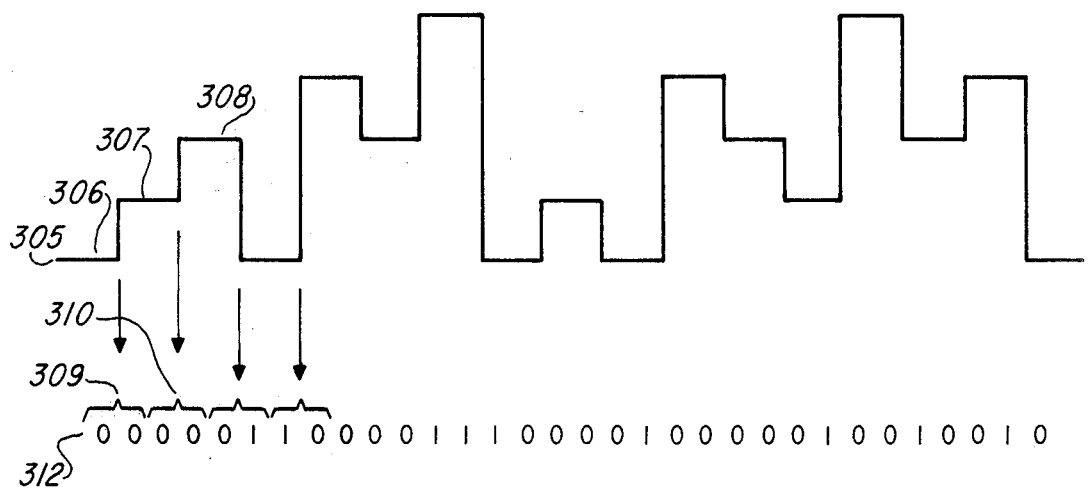

FIGS. 3a and 3b illustrate an encoding scheme of an embodiment of the invention.

In FIG. 3a the bar code target 301 consists of a plurality of bars such as 302, 303 and 304. Each bar within the bar code target 301 has a particular level of darkness, such as level 1 associated with bar 302. The sequence of bars therefore encodes a particular data string in a printed format.

FIG. 3b illustrates the electronic signal 305 derived from passing the bar code target 301. Electronic signal 305 consists of a sequence of steps such as 306, 307 and 308. Note that step 307, for example, is associated with the bar 303. In this manner, the sequence of bars 302, 303, and 304 are associated with the sequence of steps 306, 307 and 308 indicating a level 1, level 2, level 3 sequence.

In this embodiment of the invention, the transistion from one darkness level to another second darkness level is indicative of the encoding; therefore, a transition from level 1 to level 2 is assigned to indicate a value or a binary string of "00" as illustrated in the sequence from 306, 307 being translated to the "00" binary string 309. A similar operation occurs from signals 307 to signal 308 in its translation to binary string 310 of "00". In this fashion, each transistion from bar to bar is translated into its appropriate dual set of bit strings to devulge the final binary string 312. Note that although 17 bars are used in the bar code target 301, 32 bits of information are encoded therein and decoded into the binary sequence 312. This increase in data density is achieved through the use of a multi-level bar code and the associated bar code reader.

In this embodiment, five levels of darkness are utilized in the bar code. Each level has associated with it a certain degree of darkness as indicated by the darkness table 311. As an example, level 1 is a "white" while level 4 is a "grey-black".

Although this embodiment utilizes five levels of darkness, it is equally extendable to any number of levels. As a number of levels of darkness increases, the amount of data compression achieved thereby is also increased. Similarly, although this embodiment utilizes the transition from level to level to indicate the encoding of the data, other methods exist for the identical encoding and are well known in the art. One such method is the assignment to each level a particular digital value and then encoding this digital value onto a binary sequence. In the present example of FIG. 3a then, the five levels of darkness would each be assigned a value of 0 through 4 (five different values) so that the 17 bars of the bar code target 301 would have an effective data string of 34 bits.

Figure 4:
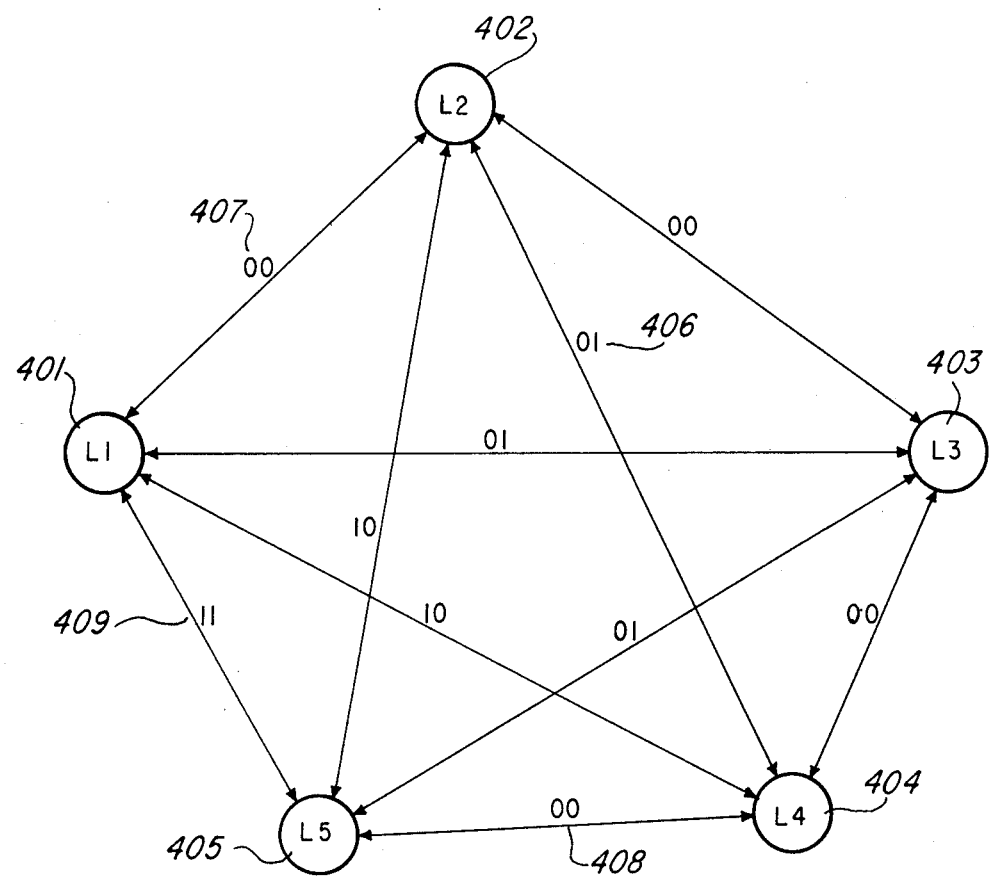
FIG. 4 is a state diagram of a five level bar code embodiment of the invention.

FIG. 4 is a graphical illustration of the encoding scheme described and utilized in the embodiment of FIG. 3a and 3b.

The use of multilevel bar code results in the creation of a finite state machine having as many states as there are levels of darkness. In the embodiment as espoused in FIG. 3a and 3b, five levels of darkness are utilized. In FIG. 4, these five levels of darkness are indicated as L1 (401), L2 (402), L3 (403), L4 (404), and L5 (405). In this embodiment, the transition from one level of darkness to another level of darkness results in the output of a particular binary string such as 406. State transition table 410 gives the outputs associated with a transmission from state L1, 401, to each other state.

As example then the transition from a level 1, 401, to a level 2, 402, results in the binary string of "00" 407 being output. A similar output results in the transition from one level to the next higher level or similarly from a higher level to the next lower level as indicated by the transition 408 from L4, 404, to L3, 403.

This encoding scheme utilizes the amount of change between levels of darkness and encodes it in the binary string to obtain a binary output. For an output of "11" 409, a change from L1, 401, to L5, 405, is required or similarly a change from L5, 405, to L1, 401 is required. Note that each transition from any state to another state is reversible to obtain the same binary string. As example, the transition from level 2, 402, to level 4, 404 and the transition from level 4, 404 to level 2, 402 results in the same binary string output "01", 406.

As noted earlier, the encoding scheme diagrammed in FIG. 4 is but one embodiment and others exist which also capitalize upon the multilevel density.

Figure 5:
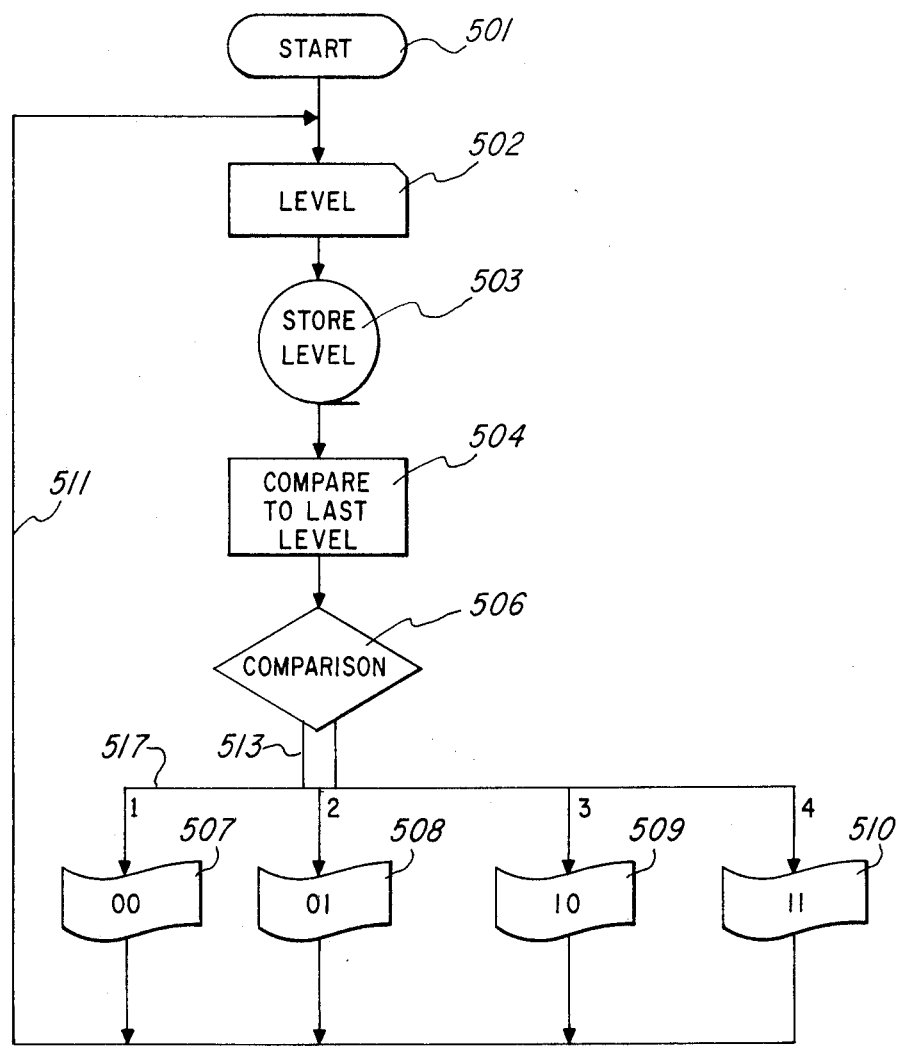
FIG. 5 is a flow-chart of the deciphering operation of a five level bar code embodiment.

FIG. 5 is a flow chart of the operation of decoding performed by the decipher means in an embodiment of the invention.

Immediately after the start up of the operation 501, the level of darkness is determined 502. This level is stored 503, for future reference. A comparison is made to the last known level 504 and this comparison results in a decision 506 on if a single (512), double (513), triple (514), or quadruple (515) change has occurred in the level of darkness. Note that this flow chart utilizes five levels of darkness since at most four levels of change of change are possible.

In the case of a single change in the level of darkness, 512, then a "00" binary string, 507, is the output. A similar type of operation occurs for a double change in level of darkness, 508 ("01"), a triple level of change 509 ("10"), and a quadruple change in the level of darkness, 510 ("11"). Once the output has been given, the procedure returns via loop 511 to obtain a another level of darkness reading.

Although this embodiment utilizes five levels of darkness it is equally extendable to 3, 4, 6, 7, etc., to achieve any desired level of density within the bar code target. In an alternate embodiment, the encoding is based upon the time duration or width of the bar so as to obtain another parameter independent of the level of darkness. This timing parameter allows for an even denser level of encoding to be achieved.

By varying the width of the bar, the effective data rate is thereby doubled so that a three level of darkness bar code scheme effectively becomes a six level since an independent variable is added to the possibilities.

FIGS. 6a, 6b, and 6c indicate an encoding scheme in which a binary sequence is translated into a bar code sequence. This is required prior to printing of the bar code target.

In FIG. 6a the desired sequence 601 is indicated as "01 10 11 00". Again a five level of darkness bar code is utilized in this embodiment. The binary sequence 601 is broken up into pairs of binary data, "01", (602), "10" (603), "11" (604), and "00" (605).

Each pair of data performs as one stage within the tree indicated in FIG. 6b. Five stages are necessary to describe four pairs of digital data. The starting bar may be any one of the five levels. The second bar though, stage 1, 608, is related to the first start point 607 in that the transition from the start point to the stage 1 state must be appropriate to describe the data pair 602. As example, the binary pair 602 is described from level 1 as a transition from L1 to L3; the transition from level 3 though, is either L3 to L1, 618 or L3 to L5, 615, in stage 1, 608.

To describe the second binary pair 603, "10" means a change of darkness level of the order of 3; hence, L1 must move L4 (616), L2 to L5 (617), etc. Stage 2, 609 has only four possible states which are encompassed since there is absolutely no way to obtain L3, 618, from the previous states. Transitions from L3, 618, in stage 2 to stage 3 therefore is ignored.

The third pair of binary data, 604, is used in the transition from stage 2 to stage 3, 610. Only two possibilities exist to describe the binary string "11", 604, that is L1 to L5, 619, and L5 to L1, 620.

Since at stage 3 only two possible states are obtainable, L1 and L5, these two are the only ones which may be considered from the transition from stage 3, 610, to stage 4, 611. The encoding of the binary string "00" 605 requires that L1 go to L2, 62, and L5 move to L4, 622.

In this way the entire binary string 601 has been defined and encoded.

In tree form in FIG. 6c, the tree is traced in the reverse order, right to left, so that a transistion from stage 4, 611 to the start 607 is obtained. Two sequences exist; a first sequence 612 of L4-L2-L5-L1-L2 (start to stage 4) and a secpmd sequence, 613 of L2-L4-L1-L5-L4 (start to stage 4). Hence, to encode the binary string 601 of "01 10 11 00", two separate and distinct sequences, a first sequence, 612, and a second sequence, 613, are equally effective in this embodiment.

The present invention creates a multilevel bar code reader which when utilized with the multilevel bar code target has higher density level and therefore a greater data string possibility due to the density level. The invention permits the use of bar code in direct relationship to printed text and also allows for the encoding of a data string having data density appropriate for control of a speech synthesizer.

I claim:

1. An electronic apparatus to be used in conjunction with a bar code target, said electronic apparatus comprising:
   a. means for generating electronic signals in response to a selected portion of said bar code target;
   b. means for generating a selected value level from a hierarchical set of at least three value levels in response to said electronic signals; and
   c. means for generating a binary data string corresponding to the difference in hierarchical level between said selected value level and the previous selected value level.

2. The electronic apparatus according to claim 1 wherein said means for generating electronic signals includes an electro-optical transducer.

3. The electronic apparatus according to claim 2 wherein said means for generating electronic signals includes means for concentrating light from said selected portion of said bar code target onto said electro-optical transducer.

4. The electronic apparatus according to claim 3 wherein said electro-optical transducer includes a charge coupled device.

5. The electronic apparatus according to claim 3 further including means for storing data from said electro-optical transducer.

6. The electronic apparatus according to claim 5 wherein said means for generating a selected value level includes timing means.

7. The electronic apparatus according to claim 6 wherein said means for generating electronic signals is handheld.

8. A bar code reader to be used in conjunction with a bar code target having at least three levels of darkness, said bar code reader comprising:
 a. means for generating a sequence of sets of electronic signals in response to selected portions of said bar code target;
 b. means for generating a sequence of values in response to said sequence of sets of electronic signals, each value indicating the darkness level of a corresponding bar of said bar code target; and
 c. means for generating a sequence of binary data strings in response to said sequence of values, each binary data string corresponding to the difference in level of consecutive values of said sequence of values.

9. The bar code reader according to claim 8 wherein said selected portions of said bar code target are sequential portions of said bar code target, selected by operator movement of said means for generating a sequence of sets of electronic signals relative to said bar code target.

10. The bar code reader according to claim 9 wherein said bar code reader is hand held.

11. The bar code reader according to claim 8 wherein said means for generating a sequence of sets of electronic signals includes an electro-optical system for sensing the level of darkness of said selected portion of said bar code target.

12. A combination comprising:
 a bar code target having a plurality of bars therein, each of said bars having a predetermined darkness chosen from a set of darkness levels having at least three levels of darkness therein; and
 a bar code reader having,
 a. means for generating a sequence of sets of electronic signals, in response to selected portions of said bar code target,
 b. means for generating a sequence of values in response to said sequence of sets of electronic signals, each value indicating the darkness level of a corresponding bar of said bar code target, and
 c. means for generating a sequence of binary data strings in response to said sequence of values, each binary data string corresponding to the difference in level of consecutive values of said sequence of values.

13. The combination according to claim 12 wherein said means for generating a sequence of sets of electronic signals is responsive to motion of said bar code reader relative to said bar code target.

14. The combination according to claim 13 further comprised of operator perceivable output means responsive to said sequence of sets of binary data.

15. The combination according to claim 14 wherein said operator perceivable output means includes speech synthesis means.

16. The combination according to claim 15 where said bar code reader is handheld.

17. The combination according to claim 15 wherein each bar of said bar code target has a predetermined thickness.

18. An electronic apparatus according to claim 1, wherein:
 said means for generating a binary data string includes means for storing said selected value level received from said means for generating a selected value level, means for comparing the hierachical levels of said selected value level and said stored selected value level and generating an indication of the difference in levels, and means for generating a binary string corresponding to said indication of the difference in levels.

19. An electronic apparatus according to claim 1, wherein:
 said means for generating a selected value level selects from a hierarchical set of five levels; and
 said means for generating a binary data string includes means for generating the binary string "00" upon detection of a hierarchical level difference of one, means for generating the binary string "01" upon detection of a hierarchical level difference of two, means for generating the binary string "10" upon detection of a hierarchical level difference of three and means for generating the binary string "11" upon detection of a hierarchical difference of four.

* * * * *